Figure 1:
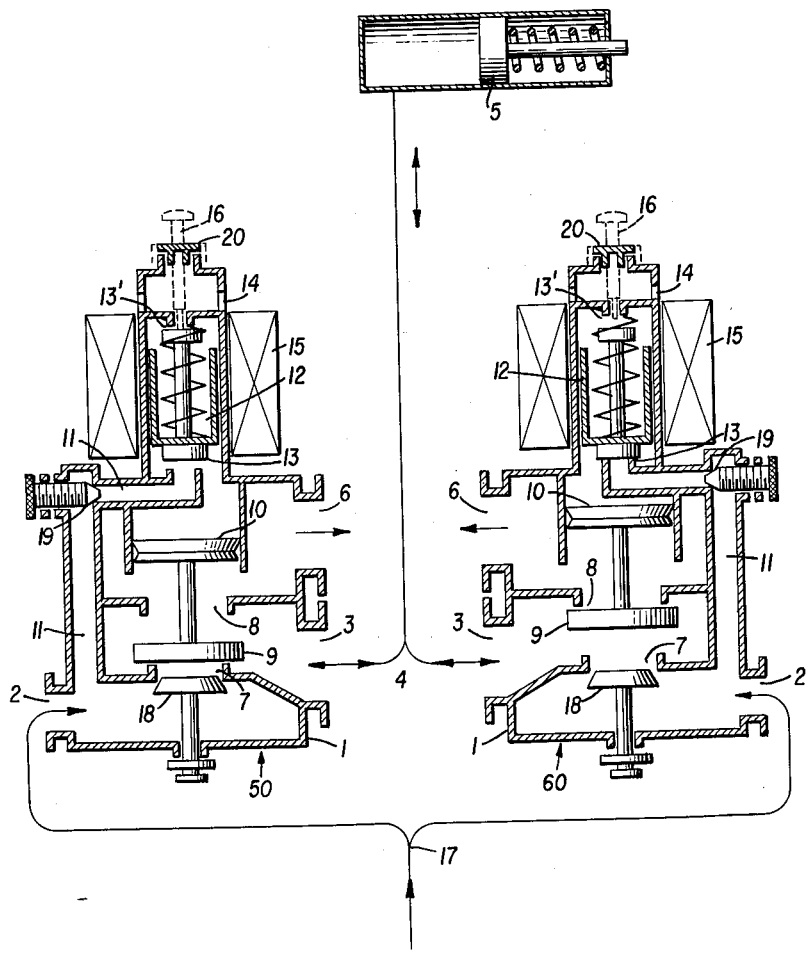

INVENTORS
ERICH HERION
ERICH RUCHSER

INVENTORS
ERICH HERION
ERICH RUCHSER

United States Patent Office 3,084,676
Patented Apr. 9, 1963

3,084,676
SAFETY CONTROL APPARATUS FOR OPERATING PRESSURE-ACTUATED DEVICES
Erich Herion, Stuttgart-Frauenkopf, Wurttemberg, and Erich Ruchser, Meimsheim, Wurttemberg, Germany; said Ruchser assignor to said Herion
Filed July 14, 1959, Ser. No. 826,935
Claims priority, application Germany July 15, 1958
11 Claims. (Cl. 121—38)

The present invention relates to a safety mechanism for controlling the operation of pressure-actuated means, particularly working pistons of machine tools, by means of a servo-pressure circuit.

It is the principal object of the present invention to provide a control mechanism which includes safety means which are adapted to stop the operation of a pressure-actuated device or pressure consumer, for example, the working piston of a machine tool, in the event of a failure in operation or improper adjustment of the control valves by automatically shutting off the supply of pressure to the pressure consumer and automatically relieving the pressure from such device.

For machine tools and especially power presses which are operated with compressed air or a pressure fluid it is known to provide valve control mechanisms for regulating the supply and discharge of the pressure medium to and from a working piston which is to be driven thereby. Such valve control mechanisms are operated either directly by hand or by means of an electromagnet which is switched on and off by a push-button switch.

The present invention relates to a control mechanism of the last-mentioned type and it attains the above-mentioned object of stopping the operation of the respective pressure consumer in the event of a failure of the control valve to work or at an improper actuation of the control valve by supplying the pressure medium to the consumer through at least one pair of multiway control valves, the inlet and outlet passages of which are respectively combined with each other, and in which the point of connection of the outlet passages is connected by a conduit to the consumer so that, if one of the valves fails to operate, the respective inlet passage which remained open will be connected through the opened outlet passage to the return passage of the other valve.

The present invention thus attains the important advantage that, if one of the valves fails to operate, the pressure acting upon the consumer will be relieved and the supply of pressure medium will be shut off from the consumer and flow into the return passage of the other valve. If two independent, but suitably interconnected multiway valves in the form of three-way valves are not actuated simultaneously but in succession, the invention also attains a safety control of the pressure-consumer since the pressure cannot build up therein unless both valves are switched on and are actuated together and simultaneously. If only one of the valves is engaged or if accidentally it remains engaged, there is no buildup of pressure possible at the consumer since the pressure normally leading thereto is shut off therefrom and released through the inlet passage of the other valve which was left open, and then flows to the return passage of the pressure medium.

A safety control mechanism according to the invention in the form of two associated multiway valves is especially desirable for the operation of a power press which may then be started only if two separate push-button switches are actuated to energize the control magnets of both valves. If one of these switches is improperly actuated, for example, if the pushbutton thereof intentionally or accidentally remains depressed, the press can not be started by means of the other pushbutton switch as soon as a suitable signal device in the control circuit of the latter is actuated.

The safety control mechanism according to the invention in the form of a pair of associated multiway control valves may also be used for controlling different operations of a machine tool. Thus, for example, for driving a power press, the brake and driving clutch thereof may each be operated and controlled by a separate pair of such control valves and by the actuation of a pair of auxiliary valves which are associated with the control valves. By means of two pairs of control valves it is then possible to actuate the brake and driving clutch of such a power press so as to occur successively and to adjust the time lag between the individual actuations of the brake and driving clutch by the provision of suitable throttling means in the auxiliary pressure circuits of the auxiliary valves of each pair of control valves.

For this purpose it is advisable to provide the auxiliary pressure conduits of each control valve at the inlet and outlet sides thereof with a suitable place into one of which a throttling device may be removably inserted, while the other place in which the throttling device is not needed at that time is closed by removable closing means.

The safety control mechanism according to the invention may consist either of an association of two separate multiway valves preferably in the form of three-way valves, or of two such three-way valves which are combined within a single housing so as to form a unit and the valve closing members of each of which may be operated either by hand or by an electromagnet. Each valve closing member is then preferably operated by means of an electromagnetically actuated auxiliary valve which controls an auxiliary pressure circuit, the pressure of which acts in a known manner upon an auxiliary valve piston which, in turn, moves the closing member of the control valve.

In order to insure that, in the event of a failure in operation of one of the multiway valves, the pressure for driving the respective apparatus or machine part will be released through the valve-inlet passage, which is then left open, to the open outlet passage of the other valve, the invention further provides that the cross-sectional area of the inlet passage be made smaller than the cross-sectional area of the outlet passage so that the larger outlet passage will also provide for the pressure release of the respective driven apparatus or pressure consumer as well as for the discharge of pressure from the open inlet passage. The size of the inlet passages of the two valves is then preferably adjustable at a point adjacent to the valve closing members by means of suitable throttling devices which are adjustable by hand or by the insertion of such devices of a fixed aperture size.

These and further objects, features, and advantages of the present invention will now be explained in detail with reference to the accompanying drawings, in which—

Figure 2:
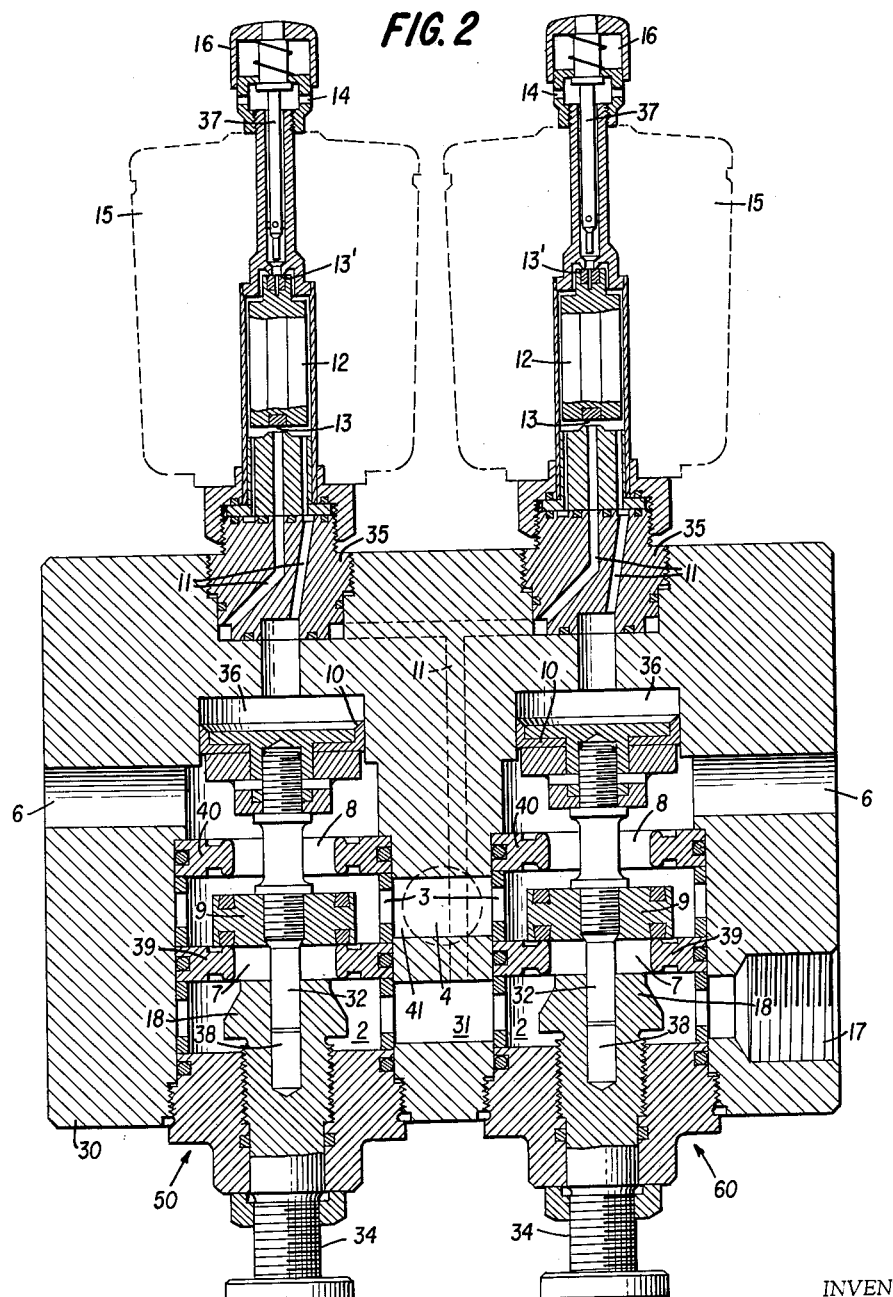

FIGURE 1 shows a diagrammatic illustration of a pressure control apparatus according to the invention consisting of a pair of separate control valves; while FIGURE 2 shows a cross section of an apparatus according to a modification of the invention in which the two control valves are combined into a single unit.

Referring first particularly to FIGURE 1, the invention consists of a valve mechanism for controlling the operation of a pressure-actuated apparatus or pressure consumer as represented in the form of a cylinder in which a piston 5 is intended to reciprocate, for example, for operating the clutch or brake of a power press. Two three-way valves 50 and 60 are each contained within a housing 1 which has a main pressure-inlet opening 2 and an outlet opening 3. The outlet openings 3 of both valve housings 1 are connected by a conduit 4 to the cylinder containing the piston 5. The second outlet 6 of each valve housing is adapted to discharge the pressure medium to the outside or, if such medium is a fluid, to return the same to a storage tank through suitable conduits, not shown. Each valve constitutes a multiway valve in which the opening of a valve port 7 at the inlet side is of a considerably smaller diameter than the opening of valve port 8 at the outlet side. Generally it is preferred to make the opening of valve port 8 four times as large as that of valve port 7. Both valve ports 7 and 8 may be controlled by a valve closing member 9. Although this valve member 9 has been indicated in FIGURE 1 to have the form of a valve disk, the valve may obviously also be made in the form of a slide valve in which the inlet and outlet ports differ similarly in size and are controlled by the same slide member.

The reverse movement of the valve may be carried out by means of an auxiliary pressure conduit leading to the face of the auxiliary piston 10, while the rear side of the latter communicates with the outlet opening 6. The pressure medium for acting upon the auxiliary piston 10 is supplied from the inlet 2 through a branch conduit 11 which leads to an auxiliary valve 12 which also forms a multiway valve for opening and closing an outlet 14. This auxiliary valve 12 controls the valve ports 13 and 13' and may consist of a plunger-like armature of an electromagnet 15 which may operate either with or without a return spring. The auxiliary valve 12 of each control valve 50 and 60 is also provided with a manual control device 16 for operating the valve by hand whenever desired.

The pressure medium is supplied from a suitable pressure source, not shown, through conduit 17 to the inlet openings 2 of the two control valves 50 and 60 which may be combined into a group. Both control valves are of the same construction and are connected with their inlets 2 to conduit 17 and with their outlets 3 to conduit 4 leading to the cylinder containing piston 5. When the auxiliary valves 12 of both control valves are actuated at the same time, both valve members 9 close the outlet passages 6, since each valve 12 then closes valve port 13, as shown at the right side of FIGURE 1, so that the pressure chamber within the valve is evacuated by valve piston 10 through outlet 14. Since the valve 50 at the left side of FIGURE 1 is normally operated in the same manner, the pressure from conduit 17 passes through both inlets 2 into conduit 4 and then to the cylinder containing piston 5.

If in the embodiment as illustrated in FIGURE 1 the left valve 50 has either failed to operate or has not been switched on, the pressure in front of valve piston 10 is not released and valve member 9 continues to maintain outlet 7 in the closed position. The cooperation of the two three-way valves 50 and 60 and the different effective sizes of their inlet and outlet passages due to the difference between ports 7 and 8 or due to the provision of throttles 18 within the inlet passages have the result that the entire mechanism also operates as a safety control device.

This is produced by the fact that, by its opened inlet passage 2, the valve which has actually been switched on, for example, valve 60 at the right side, causes an immediate drop in pressure also in the outlet passage 3 of the other valve 50 and then, through the considerably larger valve port 8, in outlet passage 6. Thus, there will be no further pressure supplied through conduit 4 to the cylinder containing piston 5. If the difference in the cross-sectional size of valve ports 7 and 8 is sufficiently great, it is also possible to relieve the pressure in the cylinder in front of piston 5. In controlling the operation of a power press, it is thus insured that this residual pressure upon piston 5 will always be smaller than necessary for operating the clutch or brake of the press. Consequently, the press will be stopped immediately.

It is advisable to provide a throttling device 18 within the inlet passage 2 at a point subsequent to the branch conduit 11 of each valve 50 and 60. This throttling device 18 may be made in the form of a conical member so as also to reduce and vary the cross-sectional area of the inlet port 7. Thus it is possible to adjust the flow ratio between the two valve ports 7 and 8 in order to adapt the safety control to the different operating requirements, or to carry out such control if the cross-sectional passages in each valve are at first equal, as illustrated in FIGURE 2.

It is furthermore possible to provide adjustable throttling devices 19 in the branch conduit 11 of each valve either in front of or behind the auxiliary three-way valve 12 or at both points. They may thus also be inserted in the same manner into the outlet passages of these auxiliary valves 12 at a point behind valve ports 13'. The respective openings for receiving the throttling devices 19 which are not required at that particular use of the valves may then be closed by removable closure members 20. Thus, the throttling devices 19 may be exchanged so as to be disposed either in the inlet passages 11 or in the outlet passages in place of closure members 20 for either building up or releasing the pressure in front of the auxiliary piston 10. If the throttling devices are inserted into the conduits 11, it is thus possible to delay the downward movement of pistons 10 for closing the inlet passages 2 and to accelerate the opening movement. If the throttling devices are, however, inserted into the outlet passages 14 and the auxiliary valves 12 are shifted downwardly to close ports 13, the pressure release in front of pistons 10 into the outlet passages 14 will be delayed, that is, valve members 9 will be opened slowly, whereas the closing movement will be accelerated. It is also possible to provide a throttling device within the outlet passage as well as within the inlet passage of each auxiliary valve 12 so that the period of the opening movement as well as of the closing movement of valve member 9 may be controlled, provided that another pair of valves is to be operated at a time different from the actuation of the first pair but by a simultaneous actuation of both pairs of valves.

By such a further modification of the double-valve mechanism according to the invention it is possible not only to prevent the operation of piston 5 in the event of a failure of one control valve but also to effect a subsequent operation of another piston 5 at a certain delay by means of another pair of such valves. Such delay may be effected when each pair of valve units is either switched on or off. By simply exchanging the position of the additional throttling devices 19 in each pair of valves it is also possible at the point of installation to adjust the length of time of the subsequent operation as well as the length of the period between the two operations. This is especially of importance if such a safety control mechanism according to FIGURE 1 is to be used for actuating the clutch of a power press and also for actuating the brake thereof since these two operations should occur not only at different times when the press is started or stopped but also in a reverse relation to each other in order to insure a very small angle of rotation of the press.

The two valves according to FIGURE 1 may be switched on either together by a single switching operation, for example, by energizing both electromagnets 15 simultaneously by the same switch, or each valve may be switched on or off separately, for example, by a separate switch for each magnet 15. This latter embodiment will also attain a proper safety control for the operation of piston 5 since it can only be placed under pressure if both valves are switched on, that is, if both switches are engaged. This is of importance, for example, in controlling the operation of a power press or other machine tool since the operator of the machine cannot actually start the machine unless both auxiliary valves 12 are either opened or closed. As long as the operator has not actuated one of the valves, the machine will remain stopped. The apparatus according to the invention is therefore intended not only for automatically stopping the operation of a working piston 5 or the like if one of the valves fails to operate, but it may also be used as a safety control for any other operation if each valve is to be actuated individually, for example, by a separate switch.

As previously mentioned, each multiway valve according to the invention should have an outlet passage several times as large as the inlet passage. This may be attained, as shown in the drawing, by making the inner width of the valve ports 7 and 8 of different sizes. It is, however, also possible to make the valve ports 7 and 8 of the same size and to use a normal three-way valve, and to insert a throttling device 18 of a suitable construction in front of valve port 7, that is, into the inlet passage, so that the desired difference in the cross-sectional area of flow between the inlet passage 2 and the outlet passage 6, that is, at the valve port 7 and the valve port 8, may be predetermined merely by such a throttling device 18. It is not necessary that the throttling device 18 be adjustable, but it may also be of a type which determines a fixed ratio of flow.

In this manner it is also possible according to the invention to combine a normal three-way valve, either with or without an auxiliary valve control which also consists of a three-way valve, with a further valve of the same construction to attain a safety valve group in the form of a pair of control valves according to FIGURE 1.

While in the embodiment according to FIGURE 1 the pressure medium is supplied from below and in front of valve members 9, it is also possible with a three-way valve to supply the pressure medium to the outlet passage 6, whereas the two connecting points 3 are combined so that both lead to the working piston 5. The former inlet passages 2 then form a part of the return conduit of the pressure medium into the storage tank or the outlet thereof toward the outside. The auxiliary piston 10 is then moved to its upper position merely by the supply of pressure medium, and valve member 9 only has to be actuated when the auxiliary valve is opened. In this event, the respective aperture sizes of valve ports 7 and 8 must, of course, be reversed.

In the embodiment as illustrated in FIGURE 1, the valve group is formed of the two three-way valves 50 and 60 in such a manner that the valve member 9 of each valve is actuated by the associated auxiliary valve 12 through the branched-off auxiliary pressure conduit. Of course, each valve member 9 may also be directly connected to an actuating member, for example, a control magnet.

In the embodiment of the invention as illustrated in FIGURE 2, two such three-way valves are combined within a common housing 30. Both valves 50 and 60 are disposed in this housing 30 so that their two inlet passages 2 are connected to lie in series behind each other. At the inside of these inlet passages 2 are the throttling devices 18 which, by means of a central bore 38, also form the bearing element of the valve shaft 32. The throttling devices 18 engage directly into the valve ports 7 of valve seats 39 and are manually adjustable from the outside in the axial direction, for example, by control knobs 34. These throttling devices are designed to vary the effective size of the inlet passages relative to that of the outlet passages 8 which terminate into outlet openings 6. Although in the embodiment illustrated, housing 30 is provided with two such outlets 6, they may also be combined into a single outlet. The chamber formed between the two valve seats 39 and 40 of each valve, that is, between the two valve ports 7 and 8, contains the valve member 9 which has seating surfaces inserted at both sides thereof. The walls between these two chambers containing valve members 9 are provided with outlet openings 3 facing toward each other and interconnected by a passage 41 which, in turn, is connected to the conduit 4 leading to the pressure-consuming apparatus.

Channel 31 connecting the two inlet passages 2 is also connected by a conduit or channel 11, shown in dotted lines, to screwed-in connecting plugs 35 through which the servo-pressure medium is passed to the auxiliary valves 12 which are mounted thereon. These auxiliary valves 12 again form three-way valves similar as described with respect to FIGURE 1, and have valve ports 13 and 13′. They are adapted to pass the pressure medium to the valve chambers 36 to act upon the auxiliary piston 10. FIGURE 2 also illustrates the manual control means 16 of each valve consisting of a spring-loaded rod 37 which may be pushed downwardly to act directly upon the respective auxiliary valve 12 in the form of an armature to shift the same downwardly and to shut off the passage of the pressure medium to chamber 36 so that the pressure therein will be released from piston 10 to escape upwardly through valve port 13′. When the plungerlike armature of the auxiliary valve 12 is not energized and in the normal position, it will therefore be pushed upwardly against valve port 13′ under the action of the auxiliary servo-pressure so that the pressure can start building up in front of the auxiliary piston 10.

Valve member 9 is then in its lower position and both valves 50 and 60 are thus shut off from the supply of pressure medium so that the pressure consumer 5 will be released. The apparatus according to FIGURE 2 may thus also be started by hand, although this must always be done by operating both manual control knobs 16 at the same time. If only one of them is depressed, the pressure consumer cannot be connected to the supply of pressure medium. The valve mechanism therefore also operates in this case as a safety device, and an operation of the respective machine tool is prevented as long as only one manual control knob 16 is depressed. The apparatus according to FIGURE 2 may, however, also be operated electrically by switching on both electromagnets 15.

If in the embodiment according to the invention each valve unit is provided with an auxiliary valve 12 for operating the valve member 9 by means of an auxiliary piston 10, it is, of course, necessary to provide that the auxiliary piston 10 is made of a size in accordance with the maximum size of valve ports 7 or 8 so that a proper closing or opening movement of the respective pair of valves will always be insured depending upon the side from which the pressure medium is supplied thereto.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A pressure fluid-operated apparatus, comprising a source of pressure fluid, a device consuming said fluid; two main valves, each having inlet means, outlet means, and open discharge means, said inlet means and said outlet means of one of said valves respectively communicating with the inlet means and the outlet means of the other valve, each valve further including a valve member movable between a first position in said valve in which said valve constitutes a first passage between said inlet means and said outlet means thereof, and a second position in which said valve constitutes a second passage between said outlet means and said discharge means thereof, the effective flow section of each of said second passages being substantially greater than the effective flow section of each of said first passages; a first conduit connecting said communicating inlet means of said valves to said source of pressure fluid; and a second conduit for connecting said communicating outlet means of said valves to said fluid consuming device, whereby said first and second conduits communicate with one of said discharge means when one of said valve members is in the second position thereof.

2. An apparatus as defined in claim 1, in which each of said main valves comprises actuating means including a multiway auxiliary valve having a pressure chamber and an auxiliary pressure conduit connected to said inlet means and terminating into said pressure chamber, a piston slidable within said chamber and positively connected to said valve member for actuating the same, and electromagnetic means for actuating said auxiliary valve to open and close said pressure conduit.

3. An apparatus as defined in claim 2, in which each of said main valves includes a housing, said inlet means of each main valve comprises an inlet valve port within said housing, said outlet and said discharge means respectively comprising a first and second opening in said housing, a partition separating said openings and having an outlet valve port therein, said second opening freely communicating with the rear side of said piston facing toward said valve member, said valve member being disposed between said inlet and outlet ports and adapted alternately to open and close said inlet and outlet ports.

4. An apparatus as defined in claim 3, in which said valve member has sealing means inserted into both faces thereof for effectively sealing said inlet and outlet ports when in closing engagement therewith.

5. An apparatus as defined in claim 2, in which each of said auxiliary valves has an outlet at the side facing in the direction opposite to said piston, each of said electromagnetic means comprising an armature adapted, when not energized, to be moved by the pressure of said pressure medium passing through said auxiliary pressure conduit to one end position to close said outlet of said auxiliary valve and, when energized, to be moved to the other end position to close said conduit relative to said pressure chamber, whereupon the pressure within said chamber will be released through said outlet of said auxiliary valve.

6. An apparatus as defined in claim 5, further comprising means for manually operating said armature.

7. An apparatus as defined in claim 1, further comprising throttling means at least within said inlet means of each main valve for determining the effective cross-sectional area of flow of said inlet means relative to that of said discharge means.

8. An apparatus as defined in claim 7, further comprising means for adjusting said throttling means from the outside of each main valve so as to vary the effective cross-sectional area of flow of said inlet means relative to that of said discharge means.

9. An apparatus as defined in claim 1, in which the effective cross-sectional area of flow of said discharge means of each main valve is greater than that of said inlet means.

10. An apparatus as defined in claim 1, in which said two main valves are contained in one housing so as to form a single unit.

11. An apparatus for controlling the flow of a pressure fluid between a source of said fluid and a device consuming said fluid, the apparatus comprising two main valves, each having inlet means, outlet means, and discharge means, said inlet means and said outlet means of one of said valves respectively communicating with the inlet means and the outlet means of the other valve, each valve further including a valve member movable between a first position in said valve in which said valve constitutes a first passage between said inlet means and said outlet means thereof, and a second position in which said valve constitutes a second passage between said outlet means and said discharge means thereof, the effective flow section of each of said second passages being substantially greater than the effective flow section of each of said first passages; a first conduit for connecting said communicating inlet means of said valves to a source of pressure fluid; and a second conduit for connecting said communicating outlet means of said valves to a fluid consuming device, whereby said first and second conduits communicate with one of said discharge means when one of said valve members is in the second position thereof, each of said main valves comprising actuating means including a multiway auxiliary valve having a pressure chamber and an auxiliary pressure conduit connected to said inlet means and terminating into said pressure chamber, a piston slidable within said chamber and positively connected to said valve member for actuating the same, and electromagnet means for actuating said auxiliary valve to open and close said pressure conduit, said valve member and said piston of each main valve being mounted on a common shaft, said apparatus further comprising a throttling member at least within said inlet means of each main valve for determining the effective cross-sectional area of flow of said inlet means relative to that of said discharge means, said throttling member also serving as a bearing member for supporting said shaft.

References Cited in the file of this patent
UNITED STATES PATENTS

| | | |
|---|---|---|
| 1,714,545 | Burns | May 28, 1929 |
| 1,817,180 | Drake | Aug. 4, 1931 |
| 2,451,010 | Yanchenko | Oct. 12, 1948 |
| 2,636,581 | Bitler | Aug. 28, 1953 |
| 2,700,986 | Gunn | Feb. 1, 1955 |
| 2,825,362 | Hick | Mar. 4, 1958 |
| 2,906,246 | Di Tirro et al. | Sept. 29, 1959 |
| 2,908,291 | Hunt | Oct. 13, 1959 |